(12) United States Patent
Bomya

(10) Patent No.: US 6,583,616 B1
(45) Date of Patent: Jun. 24, 2003

(54) MAGNETIC SENSOR

(75) Inventor: Timothy J. Bomya, Westland, MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 319 days.

(21) Appl. No.: 09/649,414

(22) Filed: Aug. 26, 2000

Related U.S. Application Data

(60) Provisional application No. 60/150,867, filed on Aug. 26, 1999.

(51) Int. Cl.[7] .......................... B60R 21/01; B60R 21/32; B60Q 1/00
(52) U.S. Cl. ............................. 324/207.17; 324/207.16; 340/436; 340/547; 280/735
(58) Field of Search .................. 324/207.2, 207.13, 324/228, 251, 236, 207.16, 207.17; 340/540, 547, 573.1, 436; 73/862.69; 307/10.1; 280/735

(56) References Cited

U.S. PATENT DOCUMENTS

| | | | |
|---|---|---|---|
| 1,813,746 A | 7/1931 | Kinsley | 324/243 |
| 3,659,197 A | 4/1972 | Alley et al. | 324/51 |
| 4,087,782 A | 5/1978 | Oishi et al. | 340/52 H |
| 4,430,645 A | 2/1984 | Eskandry et al. | 340/572 |
| 5,134,371 A | 7/1992 | Watanabe et al. | 324/252 |
| 5,177,445 A | 1/1993 | Cross | 324/637 |
| 5,580,084 A | 12/1996 | Gioutsos | 280/735 |
| 5,646,613 A | 7/1997 | Cho | 340/903 |
| 5,707,076 A | 1/1998 | Takahashi | 280/735 |
| 5,739,757 A | 4/1998 | Gioutsos | 340/667 |
| 5,747,696 A | 5/1998 | Kwun et al. | 73/728 |
| 5,767,766 A * | 6/1998 | Kwun | 340/436 |
| 5,783,871 A | 7/1998 | LeMense | 307/10.1 |
| 6,039,345 A | 3/2000 | Cech et al. | 280/735 |
| 6,246,230 B1 * | 6/2001 | Mednikov | 324/207.16 |
| 6,317,048 B1 | 11/2001 | Bomya et al. | 340/573.1 |

FOREIGN PATENT DOCUMENTS

| | | | |
|---|---|---|---|
| EP | 0 453 824 A1 | 10/1991 | G01B/77/14 |
| JP | 56-157802 | 5/1981 | G01B/77/28 |

OTHER PUBLICATIONS

Kwun, H., "Magnetostrictive Sensors Technology", reprinted from Technology Today, Mar., 1995, pp. 3–7.
Uras, M., "Signal Detection Methods for Magnetostrictive Sensors", 970604, reprinted from *Sensors and Actuators* 1997, SP–1220, Society of Automotive Engineers, Feb. 24, 1997, pp. 23–33.
U.S. application Ser. No. 09/648,528, Bomya et al., Magnetic Sensor, Filed Aug. 26, 2000.
U.S. application Ser. No. 09/648,601, Bomya, Magnetic Sensor, Filed Aug. 26, 2000.
U.S. application Ser. No. 09/648,606, Bomya, Magnetic Sensor, Filed Aug. 26, 2000.

* cited by examiner

*Primary Examiner*—Edward Lefkowitz
*Assistant Examiner*—Darrell Kinder
(74) *Attorney, Agent, or Firm*—Dinnin & Dunn, P.C.

(57) ABSTRACT

A magnetic sensor comprises at least one first coil at an associated at least one first location of a body of a vehicle and operatively connected to a ferromagnetic element of the body. A signal comprising a leading edge is applied to the at least one first coil, and a second signal is sensed from the at least one first coil, wherein said second signal is responsive to the interaction of the first signal and the ferromagnetic element, and a magnetic disturbance is localized or a crash is discriminated responsive to the second signal.

11 Claims, 2 Drawing Sheets

MAGNETIC SENSOR

The instant application claims the benefit of prior U.S. Provisional Application Ser. No. 60/150,867 filed on Aug. 26, 1999, which is incorporated herein by reference.

Figure 1:
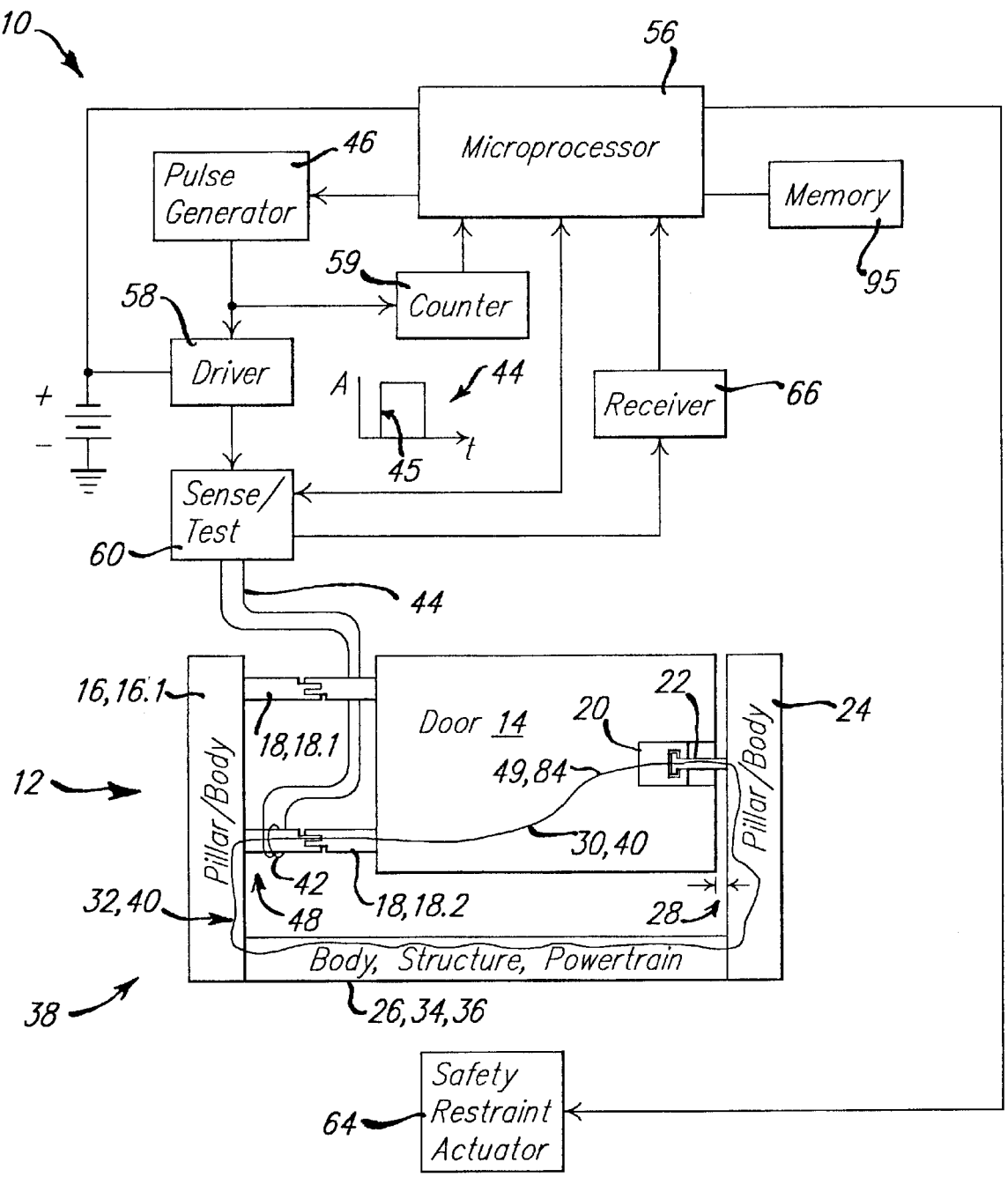
Figure 2A:
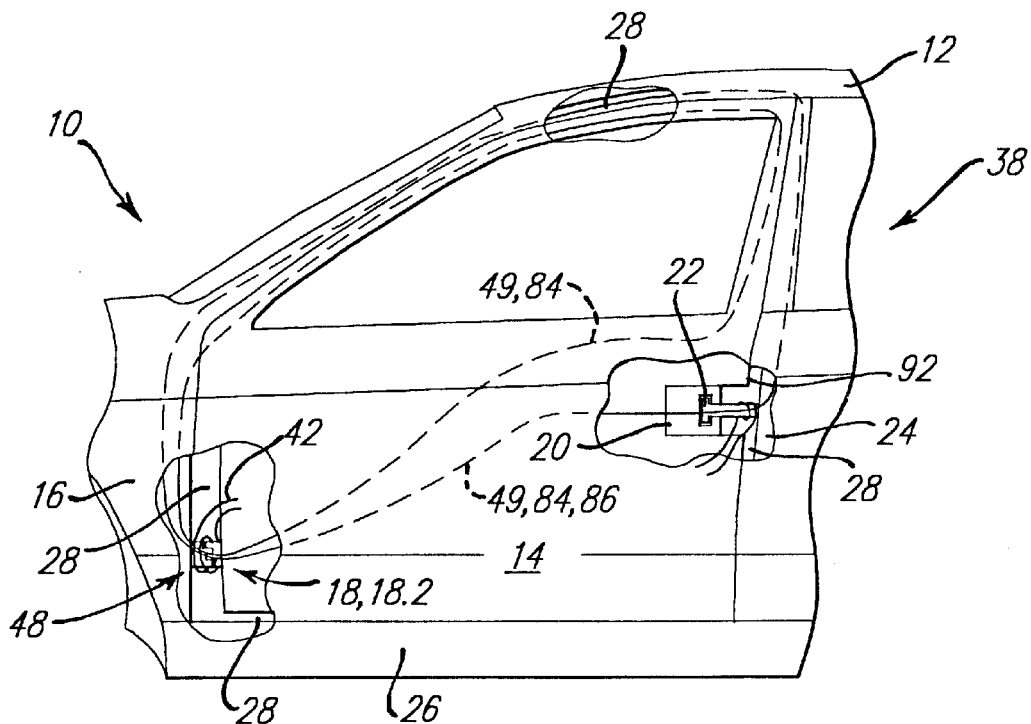
Figure 2B:
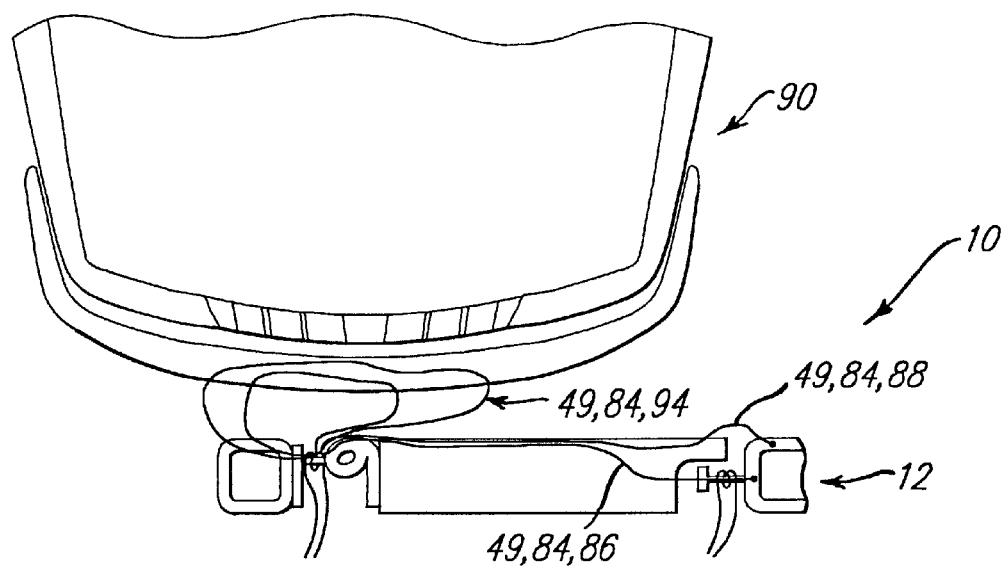

In the accompanying drawings:

FIG. 1 illustrates a block diagram of a magnetic sensor;
FIG. 2a illustrates a side view of a magnetic circuit; and
FIG. 2b illustrates a top view of a magnetic circuit.

Referring to FIG. 1, a magnetic sensor 10 is incorporated in a vehicle 12 shown schematically comprising a door 14 that hinges with respect to a first pillar 16 about a plurality of hinges 18. The door 14 has a latch/lock mechanism 20 that latches to a striker 22 on a second pillar 24.

The door 14—typically constructed with magnetically-permeable steel—has intrinsic magnetic properties. For example, the door 14 conducts magnetic flux, thereby enabling a permanent magnet to stick thereto. The hinges 18 provide a relatively low reluctance path between the door 14 and the first pillar 16. Moreover, the latch/lock mechanism 20 and the striker 22, when engaged, provide a relatively low reluctance path between the door 14 and the second pillar 24. Elsewhere, the door 14 is normally magnetically separated from the body 26 of the vehicle 12 by an associated air gap 28. Accordingly, the hinges 18 and striker 22 are magnetic ally connected by a first magnetic path 30 a long the door 14. Moreover, the first 16 and second 24 pillars—to which the hinges 18 and striker 22 are respectively attached—are magnetically connected by a second magnetic path 32—distinct from the first magnetic path 30—comprising the body 26, structure 34, or powertrain 36 of the vehicle 12. Accordingly, the door 14 is part of a magnetic circuit 38 that is similar in nature to the core of a transformer, as illustrated in FIG. 1, wherein the first 30 and second 32 magnetic paths together constitute a closed magnetic path 40.

The magnetic circuit 38 further comprises at least one first coil 42 operatively connected to at least one first signal 44. The at least one first coil 42 is located at an associated at least one first location 48, and responsive to the at least one first signal 44 generates a magnetomotive force in the magnetic circuit 38 so as to generate a magnetic flux 49 therein.

For example, as illustrated in FIG. 1, in a first embodiment, the at least one first coil 42 may, for example, comprise a first coil 42 operatively coupled a bottom 18.2 hinge that operatively couples the door 14 to the "A" pillar 16.1. Alternately, for example, the first coil 42 may be placed around the either the top 18.1 or bottom 18.2 hinge, around one or more associated mounting bolts that attach the hinge to the first pillar 16 or to the door 14; around the latch/lock mechanism 20, around the bolts that attach the latch/lock mechanism 20 to the door 14, or around the striker 22; the associated magnetic circuit 38 thereby comprising the first coil 42 inductively coupled to a core comprising the first pillar 16, the hinges 18.1, 18.2, the door 14, the second pillar 24, the air gap 28 around the door 14, and the remainder of the body 26, the structure 34 and the powertrain 36 of the vehicle 12.

The first signal 44 comprises a signal having a leading edge 45, for example a signal comprising a pulse from an pulse generator 46, which, for example, may be under control of a microprocessor 56. The signal from the pulse generator 46 is fed to a coil driver 58. The output of the pulse generator is operatively connected to a counter 59 than measures a period of time commencing with the leading edge 45 of the pulse.

Each at least one first coil 42 is driven by an associated coil driver 58 that provides sufficient power at an impedance compatible with the first coil 42 so that the resulting magnetic flux 49, after propagating in the magnetic circuit 38 and returning to the first coil 42, is sufficiently strong to be detected from the first coil 42. The coil driver 58 is also, for example, provided with short circuit protection and is operated so as to avoid saturation or clipping of the first signal 44. The coil driver 58 is designed to operate in an automotive environment, for example to operate over a associated range of possible battery voltages. The first signal 44 from the coil driver 58 may, for example, be either a voltage signal or a current signal.

The coil driver 58 drives the first coil 42 through a sense/test circuit 60. The sense/test circuit 60 senses either a current or voltage from the first coil 42 to confirm or test the operation of the first coil 42. This also provides a continuous test of the integrity of the door 14. For example, a supplemental sense coil 62 would directly sense the magnetic flux 49 generated by the first coil 42. The sense/test circuit 60 may also, for example, test the first coil 42 for an open or short so as to improve the reliability of the magnetic sensor 10, particularly when used to control the actuation of a safety restraint actuator 64, so as to prevent a false deployment or a failure to deploy when necessary. The integrity, or health, of the at least one first coil 42 is, for example, tested every measurement cycle.

The sense/test circuit 60 also provides a measure of the power delivered to the first coil 42 so that the magnetic flux 49 coupled to proximate metal objects can be estimated. For example, a steel object such as another vehicle proximate to the door 14 provides an alternate path for magnetic flux 49 from the at least one first coil 42, which affects the magnetic circuit 38 and the reluctance seen by the at least one first coil 42, thereby changing the load on the at least one first coil 42, which changes the power provided thereto by the coil driver 58. Generally, a portion of the magnetic flux 49 generated by the at least one first coil 42 is coupled within the magnetic circuit 38, and a portion bypasses the magnetic circuit 38, whether via an alternate magnetic path or by radiation. The portion of magnetic flux 49 that bypasses the magnetic circuit 38 increases the load upon the coil driver 58, which is sensed by the sense/test circuit 60 from the voltage across and the current through the at least one first coil 42.

The sense/test circuit 60 is operatively connected to a receiver 66 that detects at least one second signal 68 from a corresponding at least one first coil 42, wherein the at least one second signal 68 is responsive to magnetic flux 49 that returns to the at least one first coil 42 after propagating therefrom in the magnetic circuit 38. The magnetic flux 49 to which the at least one second signal 68 is responsive includes both a first portion of magnetic flux 49 that is conducted through the door 14, and a second portion of magnetic flux 49, i.e. leakage flux, that bypasses at least a portion of the door 14—for example as a result of an object, such as another vehicle proximate to the door 14.

The above described magnetic sensor 10 can be embodied in various ways. The particular circuitry, whether analog, digital or optical is not considered to be limiting and can be designed by one of ordinary skill in the art in accordance with the teachings herein. For example, where used, an oscillator, amplifier, logic element, modulator, demodulator, A/D converter can be of any known type, for example using transistors, for example field effect or bipolar, or other discrete components; integrated circuits; operational amplifiers, or logic circuits, or custom integrated circuits. Moreover, where used, a microprocessor can be any computing device.

In accordance with the theory of magnetic circuits and transformers, magnetic lines of flux always close on themselves and preferably follow a path of least magnetic resistance, for example so as to follow the path of ferromagnetic materials, such as steel or ferrite materials. Moreover, changes in area or permeability along the magnetic circuit cause a leakage of magnetic flux 49 proximate thereto, which leakage is also known as fringing. A magnetic circuit 38 is characterized by a reluctance R, wherein the amount of magnetic flux $\phi$ in a magnetic circuit for a given magnetomotive force F is given by $\phi=F/R$. The reluctance R of a series magnetic circuit is given by the sum of the respective reluctances of the respective elements in series. The reluctance of an air gap is significantly greater than that of a ferromagnetic material, and as a result, the magnetic flux leaks into the space surrounding the air gap, forming a leakage field. A ferromagnetic object entering the leakage field provides an alternate path for the magnetic flux, thereby bypassing the air gap and affecting the reluctance of the magnetic circuit 38. Stated in another way, the leakage flux field changes shape so that the ferromagnetic object becomes part of the magnetic circuit 38.

As illustrated in FIG. 1, a door 14 can be modeled as an element of a closed magnetic circuit 38 that is similar to a transformer core. The fore and aft ends of the door 14 are magnetically connected in series with the remainder of the magnetic circuit 38 by the hinges 18 and the coupling of the latch/lock mechanism 20 to the striker 22. The remainder of the door is magnetically insulated from remainder of the magnetic circuit 38 by an air gap 28 that otherwise surrounds the door 14.

In operation, the at least one first signal 44 operatively coupled to the associated at least one first coil 42 by the associated at least one coil driver 58 causes a current flow in the at least one first coil 42 which generates a magnetic flux 49 therein, which in turn generates a magnetic flux 49 in the magnetic circuit 38 to which the at least one first coil 42 is coupled. The magnetic flux 49 is conducted by the door 14, which is a part of the magnetic circuit 38. The at least one first signal 44 comprising a pulse voltage or current excitation signal, is applied to at least one first coil 42 operatively coupled to a hinge 18 of a door 14.

Referring to FIGS. 2a and 2b, the at least one first coil 42 converts the at least one first signal 44 into magnetic flux 49, which is then induced in the magnetic circuit 38 by virtue of the at least one first coil 42. The magnetic flux 49 comprises a plurality of magnetic flux lines 84, some of which may leak out beyond the physical boundary of the magnetic circuit 38, particularly at locations proximate to air gaps 28 in the magnetic circuit 38. The magnetic flux lines 84 follow steel and other ferromagnetic elements of the door 14 that attract magnetic flux 49 therein in relation to the permeance thereof in comparison with the substantially lower permeance of the surrounding air.

The at least one first signal 44 from the pulse generator 46 is amplified by the associated at least one coil driver 58 and operatively coupled to the at least one first coil 42 through an associated sense/test circuit 60. The at least one first coil 42 generates a magnetic flux 49 in the magnetic circuit 38, particularly the door 14. The magnetic flux 49 propagates as a pulse in the magnetic circuit 38, and the at least one first coil 42 senses that portion of the magnetic flux 49 that returns thereto.

The magnetic flux 49 travels through the magnetic circuit 38, particularly the ferromagnetic portions thereof including those of the portions of the vehicle 12, such as the door 14, that are monitored by the magnetic sensor 10. A first portion 86 of the magnetic flux 49, known herein as the bent metal flux component 86, passes through the ferromagnetic elements of the magnetic circuit 38 and a return therefrom is sensed by the at least one first coil 42, which provides a signal that is responsive to changes of the magnetic characteristics of the magnetic circuit 38. The magnetic flux 49 seeks to travel inside the steel structure of the door 14. More magnetic flux 49 automatically enters those parts of the steel that are thicker, which would likely correspond to those elements of the door structure that add strength to the door. Where the steel is thinner, the magnetic flux density is correspondingly reduced. Stated in another way, the magnetic flux 49 travels in ratiometric proportion with the cross-sectional area of the steel. The magnetic flux 49 is generally not present in the plastic parts other than as a result of leakage elsewhere in the magnetic circuit 38, however, for a steel door 14, these parts are generally not structural. Accordingly, the magnetic sensor 10 generates magnetic flux 49 that passes through the structural elements of the door, and is responsive to mechanical changes to these structural elements to a degree that those mechanical changes influence the magnetic flux 49.

A second portion 88 of the magnetic flux 49, known herein as the proximity flux component 88, extends outside the physical extent of the magnetic circuit 38 and a return therefrom is sensed by the at least one first coil 42, which provides a signal that is responsive, thereto, or in other words, that is responsive to changes of the magnetic characteristics of a region proximate to the magnetic circuit 38.

Changes to the size, shape, position, construction integrity, spot-weld quantity and integrity, material correctness, and assembly alignment of the door of the door 14; or to the magnetic environment proximate to the door 14, for example, by the presence of a ferromagnetic object such as another vehicle 90; affect the magnetic circuit 38, and thereby affect magnetic flux 49 sensed by the at least one first coil 42.

The door 14, or another part of the magnetic circuit 38 subject to surveillance, may be supplemented or modified by adding or relocating steel or other highly permeable material in the door 14 so as to modify the strength and/or shape of the respective first 86 and second 88 portions of the magnetic flux 49, thereby enhancing the associated magnetic circuit 38 so as to improve the respective signals responsive thereto. This may further enable a reduction in power to a least one coil driver 58, thereby reducing associated radiated power from the at least one first coil 42. Moreover, this may enable a reduction in gain of the associated receiver 66, which improves the associated signal-to-noise ratio. The magnetic flux 49 generally follows a path of least reluctance, which typically would correspond to sections of greatest amounts of magnetically permeable material. For a door 14 constructed of steel, this path would then correspond to one or more sections of the door that contribute substantially to the strength of the door 14. Accordingly, the magnetic circuit 38 can be optimized with respect to magnetic performance, strength and cost by this supplementation or modification of the associated magnetically permeable material.

For example, the magnetic circuit 38 can be modified or augmented in various ways, including but not limited to the following:

1. Mu-metal, ferrite or some other magnetic conductor can be added to the door 14, for example to a plastic door, to augment or re-tune the door's natural magnetic characteristic;
2. Holes may be added to the door 14 or modified, thus shifting the magnetic conduction;

3. A supplemental ferrite or mu-metal flexible linkage may be added between the "A" pillar 16.1 and the door 14 for generating the magnetic flux 49, instead of the hinges 18;
4. Ferrite or mu-metal may be placed in the striker 22 to enhance the magnetic flux 49 therein;
5. A permanent magnet may be added to the door 14 to augment or re-tune the intrinsic permanent magnetic characteristic signal of the magnetic circuit 38;
6. The magnetic structure of the door 14 can be changed, for example by using a thinner metal skin, a plastic door skin, or ferrite rods to change the magnetic gain, so as to enhance proximity sensing for enhanced system safing responsive to the proximity flux component 88;
7. The hinge or striker shape, size, or material can be changed to improve their associated magnetic characteristics; and
8. The door side-guardrail assembly and construction, the hinge assembly, or the latch/lock mechanism/striker assembly can be changed to enhance system performance and sensitivity.

In addition to the herein described use in detecting a crash or an impending crash, the magnetic sensor 10 can also be used to monitor the structural integrity of structural elements of the magnetic circuit 38, particularly the structural integrity of the door 14, for example as a post manufacturing inspection of a door 14 either mounted to a vehicle 12, or separate therefrom in a magnetic circuit of an associated test apparatus. For example, a missing structural element, such as guard rail, or poor spot welds, would likely affect the reluctance of the door 14 and if so, could be detected prior to assembly. Stated another way, a steel door that does not conduct magnetic flux 49 well would not likely have sufficient side-impact strength.

The at least one first coil 42 is responsive to a superposition of returns of the first 86 and second 88 portions of magnetic flux 49, and converts the composite of both portions to a voltage that is amplified by the receiver 66, wherein the relative strengths of the associated bent metal 72 and proximity 74 signal components is in proportion to the associated relative strengths of the first 86 and second 88 portions of magnetic flux 49. The at least one first coil 42 may be Faraday shielded to reduce noise. A coil located proximate to the end wall 92 of the door 14 tends to enhance the awareness of the proximity flux component 88 of the magnetic flux 49. This suggests that the latch/lock mechanism 20—a localized thickening of the door metal—may act be as a magnetic lens to magnify the effect of the proximity flux component 88 of a first coil 42 located proximate thereto. The air gap 28 helps to create the proximity flux component 88, and the region of greatest sensitivity by the proximity flux component 88 to approaching objects is proximate to the air gap 28. Impacts to the door 14 tend to modulate the air gap 28, causing significant changes to the associated magnetic flux lines 84, thereby causing the at least one first coil 42 to generate an associated signal of significant magnitude. The signal responsive to the modulated air gap 28 provides a measure of instantaneous recoil velocity of the door 14, which may be used to detect door bounce events for which an associated safety restraint actuator 64 is typically not deployed.

Another vehicle 90 proximate to the at least one first coil 42 attracts magnetic flux 49, thereby causing a third portion 94 of the magnetic flux 49 generated by the at least one first coil 42 to bypass the a portion of the door 14. Moreover, if the door becomes dented or deformed, the distribution and/or strength of the magnetic flux 49 in the door 14 changes, which change is sensed from a chance the signal received by the at least one first coil 42, or by a change in the load upon the at least one first signal 44 by the at least one first coil 42. Accordingly, substantially the entire door 14 acts a sensing element of the magnetic sensor 10, wherein the effect of changes to the magnetic characteristics thereof on the number and distribution of the magnetic flux lines 84 propagates at the speed of light from the location of the disturbance to the at least one first coil 42. Moreover, by placing the at least one first coil 42 on at least one hinge 18, or on the striker 22, the door 14 becomes a sensing element without actually running any wires or signal cables into the door 14. The magnetic sensor 10 using the door 14 as a sensing element in a proximity sensing mode can be used to either monitor a blind spot of the vehicle 12 to monitor traffic in an adjacent lane.

With substantially the entire door 14 as a sensor, the magnetic sensor 10 can sense incoming objects approximately of door dimension. Car bumpers and roadside poles similar to the door dimension, for which a safety restraint actuator 64 would be required in a crash, will generally be visible whereas basketball and other small objects, for which a safety restraint actuator 64 would not be required, would be less visible. A shopping cart loaded with groceries would also be visible to the magnetic sensor 10, however the decision of whether or not to deploy a safety restraint actuator 64 would be based upon more factors than just the visibility of a particular object. The magnetic sensor 10 is not responsive to impacts such as impacts to the undercarriage, for example from a rock, that do not affect the magnetic circuit 38, but which might otherwise affect an acceleration based crash sensor.

Accordingly, the magnetic sensor 10 is responsive to various to various physical effects upon the magnetic circuit 38, including but not limited to the following:

1) Changes to the air gap 28 of the magnetic circuit affecting the bent metal signal component 72.
2) Changes in the shape and density of the proximity flux component 88 proximate to the air gap 28 surrounding the door 14, including the front edge of the door 14 and front fender, the rear edge of door 14 and rear fender (or the rear door of a four (4) door vehicle), the bottom of the door 14 to floor board, and, to a lesser extent, the top of the door 14 or window frame to the roof. The bent metal signal component 72 is responsive to deformations of the door or adjacent body components that close, or short, the air gap 28.
3) The door 14, particularly the skin thereof, has a natural resonant frequency that can be excited by the at least one first coil 42 if driven at that frequency the at least one first signal 44. At this resonant frequency, if the vibrating elements of the door 14 become constrained as by contact with an impacting object, this causes a dampening of the resonance which increases the eddy current losses in the magnetic circuit 38, which can be measured by the receiver 66 from the power supplied to the at least one first coil 42.
4) The structural elements of the door 14 typically provide a path of least reluctance for the associated magnetic flux 49, and mechanical stresses therein can alter the reluctance thereof, so that changes to the magnetic flux 49 can be related to the level of forces applied to the door 14 and to the structural elements thereof, which force levels can be related to the momentum or velocity of the impacting object. Accordingly, the measurements of the magnetic flux 49 provides a measure of threat to the door 14.

Both the power applied to the at least one first coil 42, and the signal from the receiver 66—for example, the received amplitude as a function of time—is continuously monitored and stored in a memory 95 of a microprocessor 56 as a real-time magnetic signature of the door 14. The real-time magnetic signature is compared with at least one other comparable magnetic signature—for example at least one magnetic signature representing the door 14 prior to an impact or collision, i.e. a normal signature; or at least one magnetic signature representing various impacts or crashes—in order to determine if an associated safety restraint actuator 64 should be actuated. The at least one normal signature may include magnetic signatures that account for variations in the magnetic flux 49 as a result of either metal objects proximate to or approaching the door 14 or variations as a result of corrosion or variations in temperature. The normal signature may be updated over time so as to track minor perturbations of the door 14, such as due to temperature or corrosion. If the real-time magnetic signature is sufficiently different form the normal magnetic signature, the microprocessor 56 would actuate the safety restraint actuator 64.

The time corresponding to a given second signal 68 is related to propagation distance from and to the first coil 42. Accordingly, magnetic disturbances, for example as a result of an impact to the door 14, can be localized by monitoring the magnitude of the second signal 68 as a function of time.

Accordingly, the magnetic sensor 10 is responsive to both small-signal and large-signal disturbances. Small-signal disturbances would include, for example, impacts by relatively small objects such as basketballs or other sporting projectiles, which typically do not cause plastic deformation of the door 14, but for which the door 14 and surrounding weather-seal respond elastically. Large-signal disturbances would include, for example, side impacts that causes plastic deformation of the door 14, thereby permanently shifting its magnetic signature. The magnetic sensor 10 detects the change in magnetic signature from the pre-impact undeformed condition to the post-impact deformed condition. Moreover, the plastically deformed metal is work hardened which causes a change to the permeance thereof, which is sensed by the magnetic sensor 10. At the beginning of the impact, prior to plastic deformation of the door 14, the magnetic sensor 10 is able to estimate the impact velocity and severity of the impact using principles of the physics of collisions including conservation of energy and momentum, whereby the response of the door 14 increases with increasing impact severity.

The magnetic sensor 10 provides a real-time validation of the health and integrity of the respective at least one first coil 42 by testing for shorts or open conditions. Moreover, the magnetic sensor 10 provides a continuous test of the integrity of the magnetic circuit 38, including the component under magnetic surveillance, for example the door 14.

The at least one first coil 42 can be located at a variety of locations and constructed in accordance with a variety of configurations, including but not limited to the following: one or more hinges; the striker; the side impact protection rail or beam inside the door; around or proximate to the latch/lock mechanism either inside or outside the door; inside the spot weld line on the top or bottom of the door; around or proximate to the hinge bolts; on the inner door skin of a plastic or steel door with the perimeter of the coil nearly matching the perimeter of the door; around the window glass perimeter; around the entire door structure such as in the air gap surrounding the door and the opening that one passes through when entering or exiting the vehicle; in a window such as the driver-side window, as a defroster; behind a plastic door handle or trim component, along with associated electronics; around the window glass opening in the door through which the window is lowered; in the plastic side view mirror housing for sensing over an extended range, for example to locate steel objects that might pose a side-impact threat.

The magnetic fields generated by these arrangements have a variety of principal orientations, including but not limited to longitudinal, transverse, and vertical. For example, a first coil 42 can be placed around a hinge 18 so that the associated magnetic field is either longitudinal or transverse, the former arrangement providing principally a bent metal flux component 86, whereas the later arrangement providing a relatively strong proximity flux component 88. As another example, a first coil 42 around the window glass opening in the door 14 through which the window is lowered generates a vertical magnetic field that circulates around the vehicle along a transverse section thereof. As yet another example, a first coil 42 around the door 14 or window in the plane thereof generates a transverse magnetic field that is useful for proximity sensing. Different first coils 42, at least one adapted to produce principally a bent metal flux component 86 and the other adapted to produce principally a proximity flux component 88 can be used with different associated first signals 44, for example, respective first signals with different oscillation frequencies, so as to provide distinguishable signal components in the second signal 68 from the at least one first coil 42, wherein the respective signals would be demodulated by respective mixer/demodulators 70.

The operating point of the magnetic sensor 10, for example the level of magnetic flux 49 within the magnetic circuit 38 and the nominal current supplied to the at least one first coil 42, under quiescent conditions, can be adjusted by adjusting the wire gage or number of turns of at least one first coil 42.

The system safing or proximity detection can be enhanced by various means, including but not limited to placing a winding around the undercarriage, door opening, or hood of the automobile; placing a winding around the front fender of the automobile; placing a ferrite rod inside the hinge coil, or inside the striker coil for magnetic focusing; placing a ferrite rod coil in the gap or space between the doors; or placing a supplemental first coil 42 in the side-view mirror molding, which extends sidewards away from the vehicle. An additional system safing supplemental first coil 42, with proper phasing and with the magnetic circuit return properly adjusted, would substantially increase the system safing signal performance. For example, this coil could be about 3 inches in diameter and in a plane parallel to the door surface, or wound on a ferrite rod aligned to enhance the launch range and enhance the directivity for system safing. Moreover, by the combination of proximity detection and bent metal detection, together with a self-test of the associated at least one first coil 42, the magnetic sensor 10 is able to provide both safing and crash detection functions, thereby precluding the need for a separate crash accelerometer. The coils 42 and 62 of the magnetic sensor 10 could, for example, be constructed of wire wound on an associated bobbin, and then placed over an existing component of the vehicle, for example a hinge 18 or striker 22.

The coils or sensing elements may incorporate a ferrite or other high permeability magnetic core. Also, highly-tuned coils can be used for magnetic signal generation. Moreover, the width and length of coil bobbins can be adapted to steer the magnetic flux 49. Lastly, the at least one first coil 42 might incorporate ferrite rod coils placed under the vehicle chassis, in the vehicle headliner, in the "A" pillar, or in the "B" pillar, pointing towards the road.

Moreover, the signals associated with the magnetic sensor 10 can be generated, adapted or processed in a variety of ways, including but not limited to:

1. Setting up an alternate frequency to create system safing on the rear door to enhance the system safing of the front door;
2. AM, FM or pulsed demodulation of the magnetic signature;
3. Multi-tone, multi-phase electronics;
4. A magnetically-biased, phase-shift oscillator for low-cost pure sine wave generation;
5. A coherent synthetic or phased-locked carrier hardware- or microprocessor-based system;
6. A system of microprocessor gain-or offset-tuning through D/A then A/D self-adjust or self-test algorithm;
7. Placing a "standard" in the system safing field for magnetic calibration;
8. Inaudible frequencies;
9. Microprocessor-generated crystal stabilized frequencies for stability, including microprocessor D/A converter for coherent sine-wave generation;
10. Wide-band system electronics;
11. Closed loop gain- and phase-control of the signal to a sending-coil (i.e. AGC with the door acting as a delay line), wherein the gain- and phase-control signals are used as sensor outputs;
12. AC or DC operation, wherein the DC portion of the signal provides information from the net static magnetic flux 49 of the door in product with the velocity of the impact, but does not provide proximity information, and the AC approach provides the proximity field and allows the system to be ratiometric with the known and stationary transmitter gain;
13. In accordance with experiments that have shown that the phase varies as the magnetic gain across the door varies, a phase processor (FM) that has a lower signal-to-noise ratio than a gain processor (AM);
14. Monitoring the power delivered by the coil driver, particularly the bypass power, in order to detect impacts near or at the hinge(s) magnetically energized with the at least one first coil;
15. A series-resonant coil driver-circuit to increase current to flow to the at least one first coil 42 so as to improve the signal-to-noise ratio, wherein the associated current to the at least one first coil 42 is monitored to provide a continuous self-test of the at least one first coil 42, as well as a measure of the power drawn by the at least one first coil 42; and
16. Using a supplemental magnetic sensing element, for example a Hall effect device or a different coil, proximate to the at least one first coil 42 to sense the magnetic flux 49 thereat.

If both front doors are to be protected, then the effects of temperature and component variation may be mitigated by making a ratiometric measurement of comparable signals from one door relative to another, wherein it is assumed that both doors will not be simultaneously impacted. The ratiometric measurement may also be used to augment the individual measurements from each door. Furthermore, a common oscillator may be used to generate a common signal used by each associated first coil 42, so as to reduce cost and to synchronize the magnetic flux 49 generated at various locations in the vehicle 12.

Whereas the magnetic sensor 10 has been illustrated herein with the door 14 as a principal sensing element, the magnetic sensor 10 may generally be adapted to sensing the integrity of any component of any component capable of conducting magnetic flux 49, and would be advantageous for sensing large or long ferromagnetic parts. For example, the magnetic sensor 10 can be adapted to sensing other body parts, such as fenders, that are attached to the main body of the vehicle by operatively connecting an at least one first coil 42 between the body part and the main body at the point of attachment.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A magnetic sensor, comprising:
   a. at least one first coil at an associated at least one first location of a body of a vehicle, wherein said at least one first coil is operatively coupled to a ferromagnetic element of said vehicle body;
   b. a first signal operatively connected to said at least one first coil, wherein said first signal comprises a leading edge;
   c. a means for sensing at least one second signal from said at least one first coil, wherein said second signal is responsive to the interaction of a magnetic field with said ferromagnetic element of said vehicle body, wherein said magnetic field is generated by said at least one first coil responsive to said first signal; and
   d. a means responsive to said at least one second signal for discriminating a crash involving said ferromagnetic element of said vehicle body.

2. A magnetic sensor as recited in claim 1, wherein said means for sensing senses said second signal for a first period of time after the beginning of said leading edge.

3. A magnetic sensor as recited in claim 1, further comprising a counter, wherein said counter measures a variable period of time following said leading edge.

4. A magnetic sensor as recited in claim 3, further comprising a processor, wherein said processor monitors a magnitude of said second signal as a function of said variable period of time measured by said counter.

5. A magnetic sensor as recited in claim 1, wherein said first signal comprises a pulse generated by a pulse generator.

6. A magnetic sensor as recited in claim 1, wherein at least one said at least one first coil is proximate to a vehicle body element selected from a door hinge or a mounting bolt thereof, a door lock or latch mechanism or a mounting bolt thereof, a striker of a door lock or latch mechanism or a mounting bolt thereof, a door reinforcing element, and an end wall of a door.

7. A magnetic sensor as recited in claim 6, wherein at least one said at least one first coil is around at least one said vehicle body element.

8. A magnetic sensor as recited in claim 1, wherein at least one said at least one first coil is proximate to a vehicle body element selected from a door, a door opening, a portion of a side view mirror housing and a window opening.

9. A magnetic sensor as recited in claim 8, wherein at least one said at least one first coil is around at least one said vehicle body element.

10. A magnetic sensor, comprising:
a. at least one first coil at an associated at least one first location of a body of a vehicle, wherein said at least one first coil is operatively coupled to a ferromagnetic element of said vehicle body;
b. a first signal operatively connected to said at least one first coil, wherein said first signal comprises a leading edge;
c. a means for sensing at least one second signal from said at least one first coil, wherein said second signal is responsive to the interaction of a magnetic field with said ferromagnetic element of said vehicle body, wherein said magnetic field is generated by said at least one first coil responsive to said first signal; and
d. a means responsive to said at least one second signal for localizing a magnetic disturbance of said ferromagnetic element of said vehicle body.

11. A magnetic sensor as recited in claim 10, wherein said means for localizing a magnetic disturbance comprises a counter and a processor, whereby said counter measures a period of time following said leading edge, and said processor monitors a magnitude of said second signal as a function of said period of time.

* * * * *

UNITED STATES PATENT AND TRADEMARK OFFICE
CERTIFICATE OF CORRECTION

PATENT NO. : 6,583,616 B1 Page 1 of 1
DATED : June 24, 2003
INVENTOR(S) : Timothy J. Bomya It is certified that error appears in the above-identified patent and that said Letters Patent is hereby corrected as shown below:

Column 1,
Line 26, "magnetic ally" should be changed to -- magnetically --;
Line 26, "a long" should be changed to -- along --; and
Line 49, delete the first occurrence of "the".

Column 5,
Line 39, "72" should be deleted after "bent metal"; and
Line 40, "74" should be deleted after "proximity".

Column 6,
Line 1, "chance" should be changed to -- change in --;
Line 34, "to various" should be deleted; and
Lines 38 and 46, "72" should be deleted after "component".

Column 10,
Line 4, the second occurrence of "of any component" should be deleted.

Signed and Sealed this

Twenty-eighth Day of December, 2004

JON W. DUDAS
*Director of the United States Patent and Trademark Office*